(12) United States Patent
McNeill et al.

(10) Patent No.: US 7,161,962 B1
(45) Date of Patent: Jan. 9, 2007

(54) METHOD AND APPARATUS FOR CODING MODEM SIGNALS FOR TRANSMISSION OVER VOICE NETWORKS

(75) Inventors: Scott McNeill, San Diego, CA (US); Maroula S. Bratakos, San Diego, CA (US)

(73) Assignee: Nuera Communications, Inc., San Diego, CA (US)

( * ) Notice: Subject to any disclaimer, the term of this patent is extended or adjusted under 35 U.S.C. 154(b) by 0 days.

(21) Appl. No.: 09/321,351

(22) Filed: May 27, 1999

(51) Int. Cl.
*H04J 1/02* (2006.01)
*H04L 12/28* (2006.01)
*H04L 12/56* (2006.01)

(52) U.S. Cl. ............... 370/493; 370/410; 370/436; 379/93.09; 379/93.06

(58) Field of Classification Search ........... 370/493, 370/420, 427, 294, 410, 435, 436, 494, 521, 370/522; 379/93.01, 93.06, 93.09; 375/222, 375/242, 245
See application file for complete search history.

(56) References Cited

U.S. PATENT DOCUMENTS

| | | | | |
|---|---|---|---|---|
| 4,164,036 | A * | 8/1979 | Wax | 702/74 |
| 5,185,609 | A * | 2/1993 | DeBord | 342/173 |
| 5,463,661 | A * | 10/1995 | Moran et al. | 375/222 |
| 5,528,679 | A * | 6/1996 | Taarud | 379/32.04 |
| 5,959,677 | A * | 9/1999 | Date et al. | 375/240.01 |
| 5,999,898 | A * | 12/1999 | Richter | 704/217 |
| 6,263,016 | B1 * | 7/2001 | Bellenger et al. | 375/222 |
| 6,320,867 | B1 * | 7/2001 | Bellenger et al. | 370/420 |
| 6,369,737 | B1 * | 4/2002 | Yang et al. | 341/155 |
| 6,434,169 | B1 * | 8/2002 | Verreault | 370/522 |
| 6,449,592 | B1 * | 9/2002 | Das | 370/224 |

OTHER PUBLICATIONS

Pan, Davis Y, Digital Audio Compression, Spring 1993, Digital Technical Journal, vol. 5 No. 2 whole document.*

* cited by examiner

*Primary Examiner*—Chirag Shah
(74) *Attorney, Agent, or Firm*—Schwegman, Lundberg, Woessner & Kluth, P.A.

(57) ABSTRACT

A method and apparatus of transmitting a modulated data over a digital voice network that includes voice compression. The method and apparatus determine whether a voice signal to be transmitted over the network includes a modulated data signal and then encodes or demodulates the modulated data signal and bypasses voice compression when a modulated data signal is detected. The method and apparatus may detect a modulated data signal by detecting the presence of an answer tone and then searching for a plurality of phase reversals having a particular time distance from each other in the voice signal. Once the encoded or demodulated signal is transmitted over the digital voice network, the method and apparatus of the present invention may detect whether the received signal is an encoded data signal or a demodulated data signal. Then the coded data signal may be decoded back into a modulated data signal. Likewise, the demodulated data signal may be modulated back into a modulated data signal. In one embodiment, the invention encodes voice signals including modulated data signals by linearly quantizing the voice signals.

50 Claims, 4 Drawing Sheets

METHOD AND APPARATUS FOR CODING MODEM SIGNALS FOR TRANSMISSION OVER VOICE NETWORKS

BACKGROUND OF THE INVENTION

1. Field of the Invention

This invention relates to methods and apparatus for processing modem signals in networks and more particularly to methods and apparatus for processing modem signals in networks having voice compression.

2. Description of Related Art

Modems are commonly used to transmit digital data signals d(n) over digital or analog voice networks. A first modem connected to a point of entry of a voice network generates an analog voice signal s(t) containing the digital data signal d(n) by modulating the digital data signal d(n) using known modulation techniques such as V.22bis and V.32bis modulation techniques. A second modem connected to a point of exit of the voice network converts or demodulates the transmitted analog voice signal s'(t) into a digital data signal d'(n) representing the original digital data signal d(n) subject to data loss. In digital voice networks, one source of data loss may be packet loss, i.e., one or more digital packets representing the voice signal s(t) may be lost during transmission from the first modem to the second modem across the digital voice network.

Another source of data loss may be due to digital voice compression of the voice signal s(t) as it is converted to a digital voice signal s(n) and transmitted over the digital voice network. A normal voice signal s(t), when digitized s(n), uses a bandwidth of 64 kbps for transmission across a digital network. This bandwidth enables the transmission of modem signals as well as voice signals with very low distortion. As noted, however, may digital voice networks compress voice signals s(t) prior to transmission as digital packets containing a digital signal s(n) representing the voice signal s(t). FIG. 1 is a block diagram of a prior art transmission system for transmitting voice signals s(t).

As shown in FIG. 1, the system includes a digital voice encoder 2, digital voice network 30, and digital voice decoder 4. The digital voice encoder 2 converts a received voice (or modem signal) s(t) into a plurality of digital packets representing a digital version s(n) of the voice signal. The digital voice network 30 transports the plurality of digital packets to the voice decoder 4. As noted above, the digital voice network 30 may be a lossy system, i.e., one or more of the plurality of digital packets may not be delivered or delivered out of order. Voice decoder 4 receives the digital packets representing a digital voice signal s'(n) from the digital voice network 30 and generates a voice/modem signal s'(t) from the received digital packets.

As shown in FIG. 1, the voice encoder may include a voice compression unit 16. The voice compression unit attempts to remove redundant speech information from the received speech signal s(t). As noted above, digital speech signals s(n) are commonly 64 bps signals prior to compression. After compression, the digital speech signals s(n) may be 8 kbps or less. As noted, the compression unit 16 attempts to remove redundant speech information and consequently may distort or corrupt modem signals. Some compression units may distort or corrupt the modem signals so severely that the modulated signal can not be demodulated without losses.

To counter for or reduce such error losses, the data rate of a digital signal d(n) modulated into a voice signal s(t) to be transmitted by a network having voice compression may be reduced. For example, the maximum data rate of a digital signal d(n) modulated into a voice signal s(t) that is processed by a compression unit 16 using the well known, low distortion ADPCM (G.721) 32 kpbs compression algorithm is 4800 bps. Thus, even though the compressed digital voice signal s(n) is a 32 kpbs signal, only a 4800 bps digital signal d(n) can be transmitted across a digital voice transmission system 5 employing such a compression unit. This is a highly inefficient use of bandwidth considering the voice compression unit 16 is added to reduce bandwidth consumption. Thus, a need exists for a digital voice transmission system 5 that more efficiently transmits modulated digital signals as well as compressed voice signals.

SUMMARY OF THE INVENTION

The present invention is a method and an apparatus of transmitting a modulated data signal over a digital voice network that includes voice compression. The method and apparatus determines whether a voice signal to be transmitted over the network includes a modulated data signal and then encodes or demodulates the modulated data signal and bypasses voice compression when a modulated data signal is detected. The method and apparatus may detect a modulated data signal by detecting the presence of an answer tone and then searching for a plurality of phase reversals having a particular time distance from each other in the voice signal. Once the encoded or demodulated signal is transmitted over the digital voice network, the method and apparatus of the present invention may detect whether the received signal is a coded data signal or a demodulated data signal. Then the encoded data signal may be decoded back into a modulated data signal. Likewise, the demodulated data signal may be modulated back into a modulated data signal.

In one embodiment the invention is a method of determining whether a voice signal includes a modulated data signal. In this embodiment, the method first determines whether an answer tone is present in the voice signal. When an answer tone is detected, the method then locates or searches for a first phase reversal in the voice signal. Upon the detection of the first phase reversal, the method locates or searches for a second phase reversal in the voice signal, the second phase signal being the next consecutive phase reversal in the voice signal after the first phase reversal. The time interval between the location of the first phase reversal in the signal and the second phase reversal in the voice signal is then determined and compared to a predetermined range of time values. When the time interval is between the predetermined range of time values, the method indicated that the voice signal includes a modulated data signal.

In an exemplary embodiment, the step of determining whether a first or second phase reversal is present in the voice signal includes first determining the autocorrelation of a segment of the voice signal and searching the autocorrelation of the segment of the voice signal for its lowest value. The lowest autocorrelation value is compared to a predetermined value and a phase reversal is considered to be present in the segment when the lowest autocorrelation value is less than the predetermined value. In a further embodiment, the invention locates or searches for a third phase reversal in the voice signal, the third phase signal being the next consecutive phase reversal in the voice signal after the second phase reversal when the time interval between the first and second phase reversal is not between the predetermined time interval. The invention indicates that the voice signal includes a modulated data signal when the determined time interval between the location of the second phase reversal in the signal and the third phase reversal in the voice signal is between the predetermined range of time values. Otherwise, the invention indicates that the voice signal does not include a modulated data signal.

In a further preferred embodiment of the invention the step of determining whether an answer tone is present in the voice signal includes selecting a segment of the voice signal and converting the segment of the voice signal from a time domain signal to a frequency domain signal. Then the energy of a bin of the frequency domain signal that corresponds to the frequency of the answer tone is compared to the energy of neighboring or adjacent frequency bins. The voice signal is considered to have the answer tone when the energy of the frequency bin corresponding to the frequency of the answer tone is greater than the energy of the adjacent frequency bins. It is noted that the frequency content of the segment of the voice signal may be reduced by down sampling prior to conversation to the frequency domain in order to reduce computations.

The present invention also includes a method of packetizing a digital voice signal for transmission over a digital voice network where the voice signal may include a modulated data signal. The method determines whether the voice signal includes a modulated data signal as described above. In one embodiment when it is determined that the voice signal includes a modulated data signal, the voice signal is demodulated, generating a digital data signal. In another embodiment when it is determined that the voice signal includes a modulated data signal, the voice signal is encoded into a digital data signal comprising the modulated data signal by linearly quantizing the voice signal. In either case the resultant digital data signal is packetized into a plurality of digital packets for transmission over the digital voice network.

In one embodiment, when it is determined that the voice signal does not include a modulated data signal, the voice signal is compressed packetized into a plurality of digital packets for transmission over the digital voice network. It is noted that the step of linearly quantizing the voice signal to generate the digital data signal may include normalizing the voice signal and converting the normalized voice signal into a digital floating point signal. Further the step of normalizing the voice signal may include finding the sample of the voice signal having the maximum value and normalizing the sample of the voice signal having the maximum value by left shifting the sample until all redundant sign bits are eliminated where NLS is the number of left shifts. Then all the samples of the voice signal may be right shifted as a function of NLS. In an exemplary embodiment, all the samples of the voice signal may be right shifted as a function of NLS and the bit precision of the mantissa of the floating point signal. Further, all the samples of the voice signal may be right shifted by 16-NLS-N_prec where N_prec is the bit precision of the mantissa of the floating point signal. In this embodiment, N_prec may be set to 4 for 24.8 bits per second (BPS) data signals, 5 for 30.8 BPS data signals, 6 for 36.8 BPS data signals, and 7 for 42.8 BPS data signals.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

Figure 1:
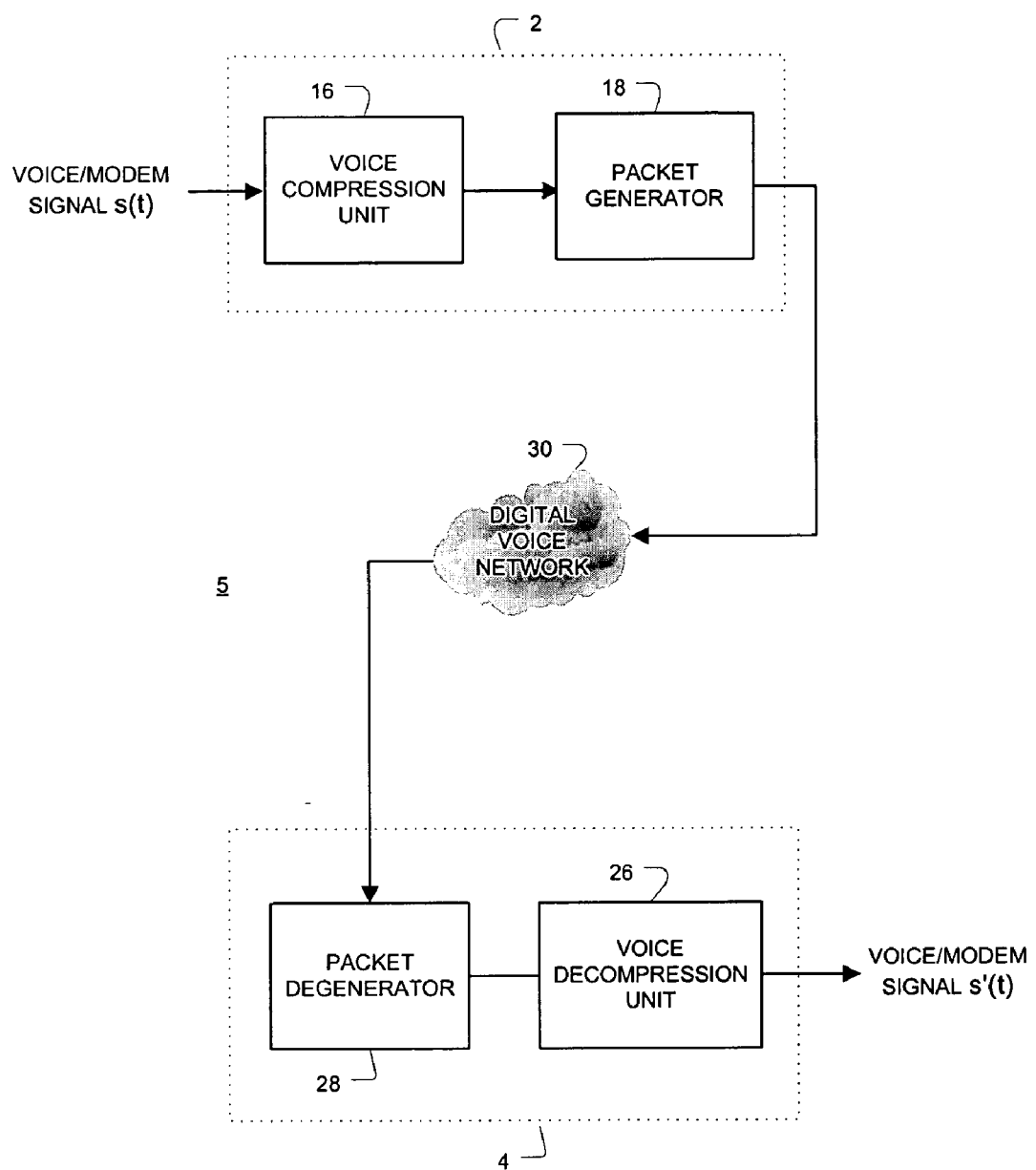
FIG. 1 is a block diagram of a prior art digital voice transmission system including voice compression.
Figure 2:
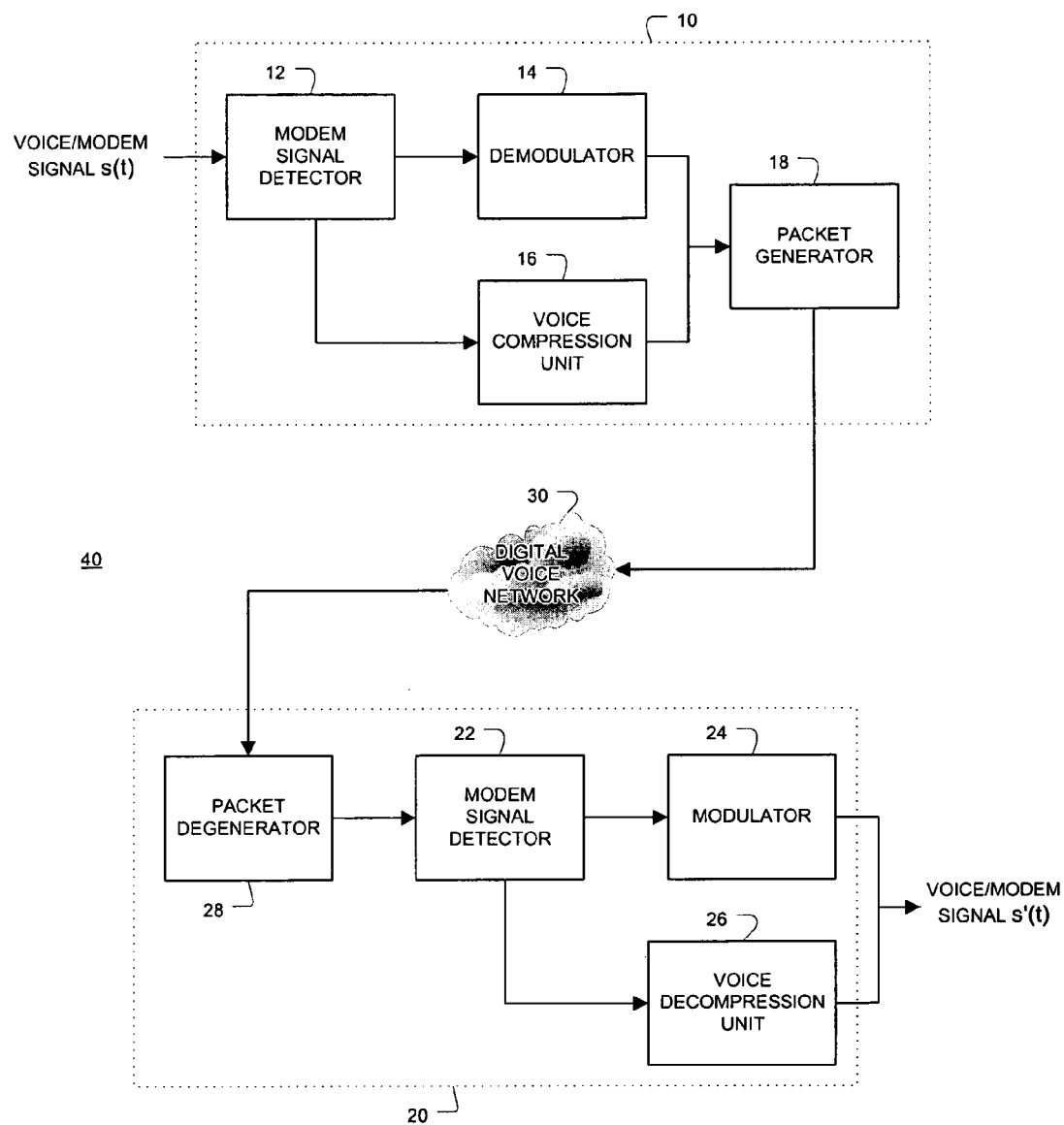
FIG. 2 is a block diagram of a first exemplary digital voice transmission system in accordance with the present invention.

As noted above, prior art digital voice transmission systems 5 (as shown in FIG. 1), do not efficiently use the bandwidth of the digital voice network 30 when transmitting modulated digital data signals. FIG. 2 is a diagram of a first exemplary digital voice transmission system 40 that more efficiently transmits modulated digital data signals. As shown in FIG. 2, the system 40 includes a digital voice signal encoder 10, a digital voice network 30, and a digital voice signal decoder 20. The system 40 relays digital data signals d(n) by first detecting the modem signal s(t) at the entry point to the voice encoder 10. In particular, the modem signal detector 12 analyzes received voice/modem signals s(t) to determine if the signal is a modulated data signal. An exemplary signal detector 12 is described in detail below with reference to FIG. 4.

When a modem signal is detected, the demodulator 14 converts or demodulates the signal s(t) back to the underlying digital data signal d(n) using techniques known to those of skill in the art. Otherwise, the voice compression unit 16 compresses the signal s(t) by removing redundant data and converts the signal to a digital signal s(n). Then, the packet generator 18 converts either the digital data signal d(n) or the digital voice signal s(n) to a plurality of packets as described in more detail below. The packet generator 18 may add header information to one or more of the plurality of packets to indicate whether the packets represent a voice or data signal. The header information may also indicate the type of modulation used to originally form the s(t) signal when the packets represent digital data. The plurality of digital packets is transmitted across the digital voice network 30 to the digital voice signal decoder 20.

The packet degenerator 28 of the decoder 20 first converts the received packets back into a digital signal s(n). A modem signal detector 22 determines whether the digital signal represents a digital voice signal s(n) or a digital data signal d(n). As described below in more detail and noted above, a header bit in one or more of the packets may indicate whether the digital signal is a voice or data signal. When the modem signal detector 22 determines the digital signal represents a digital data signal, the modulator 24 remodulates the digital data signal back into a modem signal s(t) using techniques known to those of skill in the art. As noted above, one or more of the packets may have a header that includes information which indicates the type of modem compression originally present in the signal s(t) prior to demodulation by the demodulator 14. Otherwise, when the digital signal represents a compressed voice signal s(n), the voice decompression unit 26 decompresses the signal using techniques known to those of skill in the art. The resultant signal s'(t) represents the original signal s(t) presented to the digital voice transmission system 40 provided no packets are lost and not recovered.

The relying technique used in the system 40 is most efficient use of bandwidth of the system since no bandwidth is wasted as described above when modem signals are processed by voice compression units. The system 40, however, is computationally complex because it adds a modulator 24 and demodulator 14 to the system 40. Depending on the modulation technique used to generate the modem signal s(t), the additional computational complexity, memory constraints, processor speed or other chip level issues may prevent the implementation of the techniques. Consequently, a compromise between bandwidth and computational complexity, memory, or processor speed may be required for different system implementations.

Figure 3:
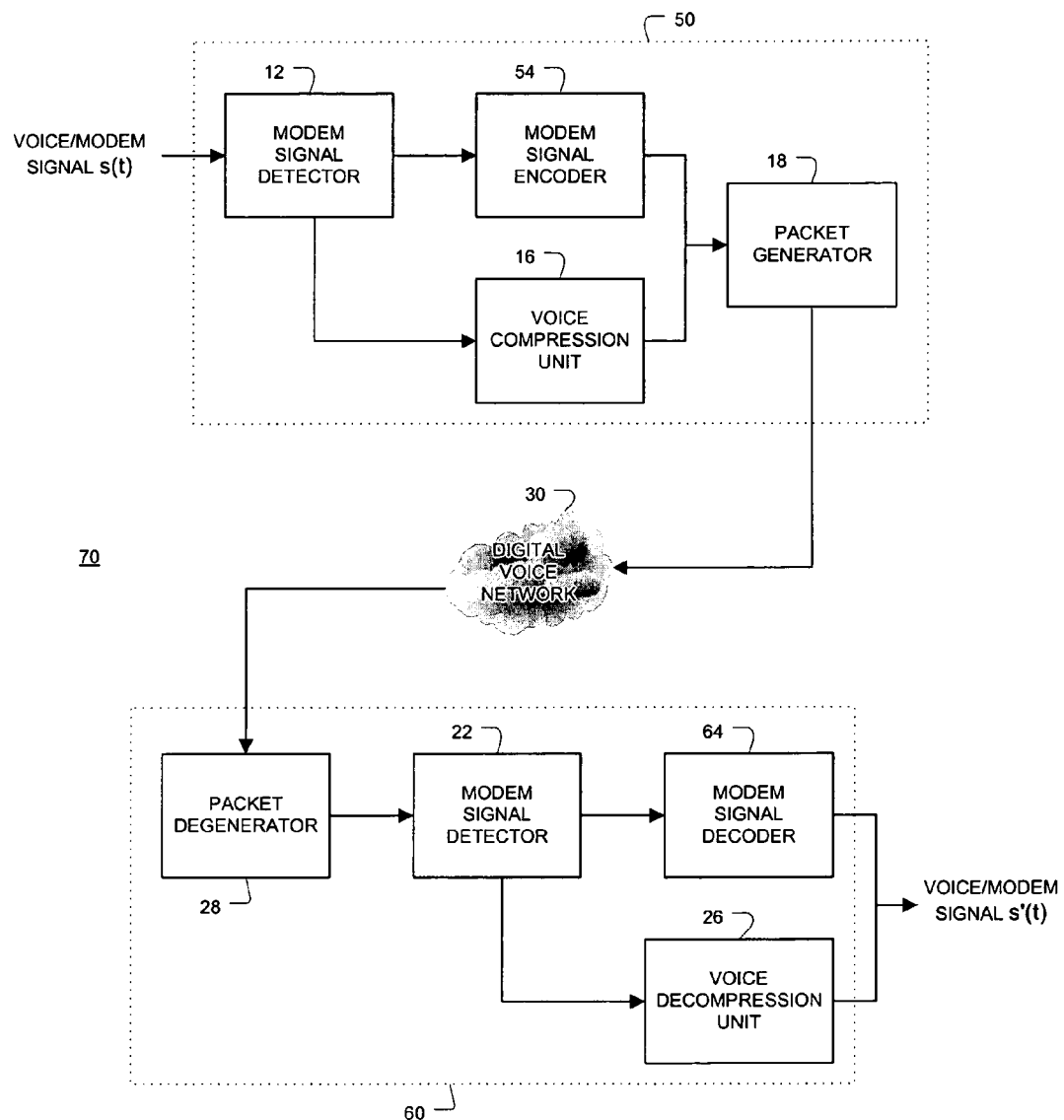
FIG. 3 is a block diagram of a second exemplary digital voice transmission system in accordance with the present invention.

FIG. 3 presents a second exemplary digital voice transmission system 70 in accordance with the present invention that employs a modem encoder 54 and decoder 64 in place of a demodulator 14 and modulator 24. As explained below, the system 70 uses more bandwidth to transmit a signal than the system 40 but is less computationally complex and takes considerably less time to design and implement. For example the system 40 requires 9.6 kbps of network bandwidth to send a V.32bis 9600 bps signal while a transparent modem encoder of system 70 might use as much as 30 kbps of network bandwidth. Developing a modulator 24 and demodulator 14 for V.32bis might take 6 man months, however, whereas developing a modem encoder 54 and decoder 64 for system 70 would probably take only 2 man weeks.

As shown in FIG. 3, the digital voice transmission system 70 includes a digital voice signal encoder 50, a digital voice network 30, and a digital voice signal decoder 60. The system 70 codes digital data signals d(n) by first detecting the modem signal s(t) at the entry point to the voice encoder 50. As for the system 40, the modem signal detector 12 analyzes received voice/modem signals s(t) to determine when the signal is a modulated data signal. An exemplary signal detector 12 is described in detail below with reference to FIG. 4.

Figure 5:
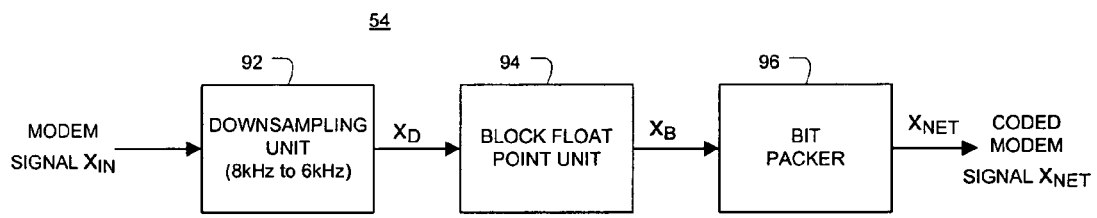
FIG. 5 is a block diagram of an exemplary modem signal encoder in accordance with the present invention where the encoder may be employed in the digital voice transmission system shown in FIG. 3.

When a modem signal is detected, a modem signal encoder 54 codes the signal s(t) into a coded modem signal $x_{net}(n)$ using a process and apparatus described in detail below with reference to FIG. 5. Otherwise, the voice compression unit 16 compresses the voice signal s(t) by removing redundant data and converts the signal to a digital signal s(n). Then, the packet generator 18 converts either the coded modem signal $x_{net}(n)$ or the compressed digital voice signal s(n) into a plurality of packets as described in more detail below. The packet generator 18 may add header information to one or more of the plurality of packets to indicate whether the packets represent a voice or data signal. The header information may also indicate the type of modem coding used to generate the coded modem signal $x_{net}(n)$. The plurality of digital packets is transmitted across the digital voice network 30 to the digital voice signal decoder 60.

The packet degenerator 28 of the decoder 60 first converts the received packets back into a digital signal s(n). A modem signal detector 22 determines whether the digital signal represents a digital voice signal s(n) or a coded modem signal $x_{net}(n)$. As noted above, a header bit in one or more of the packets may indicate whether the digital signal is a voice or data signal. When the modem signal detector 22 determines the digital signal represents a coded modem signal, the modem signal decoder 64 converts the coded modem signal $x_{net}(n)$ back into a modem signal s(t) as described in more detail below with reference to FIG. 6. As noted above, one or more of the packets may have a header that includes information, which indicates the type of coding performed by the modem signal encoder 54. Otherwise, when the digital signal represents a compressed voice signal s(n), the voice decompression unit 26 decompresses the signal using techniques known to those of skill in the art. The resultant signal s'(t) represents the original signal s(t) presented to the digital voice transmission system 70 provided no packets are lost and not recovered.

Figure 4:
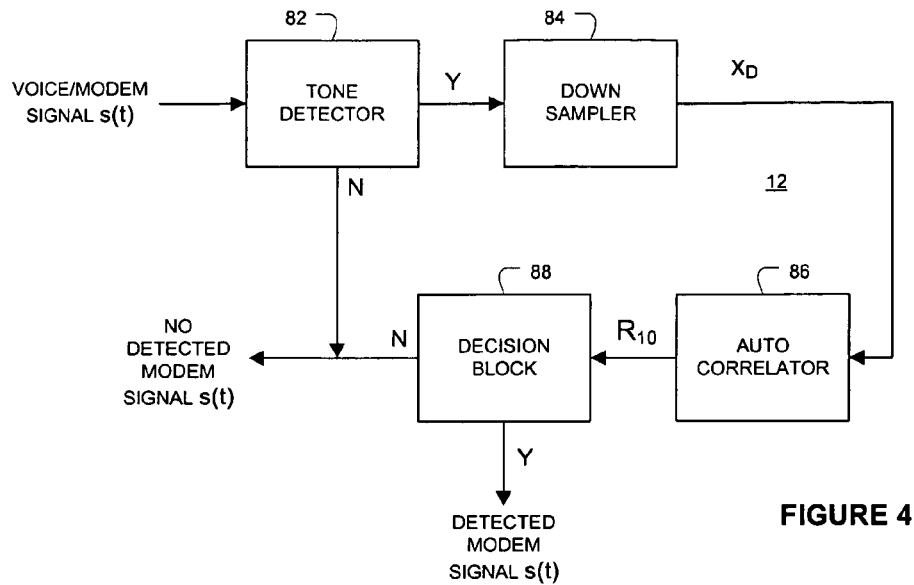
FIG. 4 is a block diagram of an exemplary modem signal detector in accordance with the present invention where the detector may be employed in the digital voice transmission system shown in FIG. 2 or 3.

As noted above, the two exemplary systems 40 and 70 each include a modem signal detector 12 that determines whether a signal s(t) includes a modem signal. An exemplary apparatus and method of determining whether a signal s(t) is a modem signal is presented with reference to FIG. 4. As shown in FIG. 4, the modem signal detector 12 includes a tone detector 82, down sampler 84, autocorrelator 86, and decision block 88. In brief, the detector 12 identifies whether the signal s(t) includes a modem signal by determining whether a phase reversal that occurs every 450 ms in 2100 Hz answer tones transmitted by many answering side modems (according to ITU Recommendation V.25) is present in the signal s(t). As described in more detail below, the tone detector 82 first determines whether a 2100 Hz answer tone is present in the signal s(t). The down sampler 84, autocorrelator 86, and decision block 88 are used to determine whether a phase reversal occurs every 450 ms.

In one embodiment of the modem signal detector 12 the signal s(t) is first digitally sampled at a 8 kHz rate to generate a digital signal $x_{in}(n)$. It is noted that the phase reversal of the signal s(t) occurs during the first second of the answer tone in modem protocols that incorporate the V.25 signal at the beginning of the modem handshake, such as V.22bis and V.32bis. Consequently, only signals s(t) generated by modems that incorporate the V.25 signal may be identified using one exemplary detector in accordance with the present invention. A summary of the exemplary operation of the modem signal detector 12 follows: in a preferred embodiment, the modem signal detector 12 operates on blocks of 120 or 160 linear samples at a time. The tone detector 82 first rejects signals outside the range of 2100 Hz +/−15 Hz, i.e., if the signal does not have a tone within this range, no tone is detected. Then, the down sampler 84 down samples the sampled signal $x_{in}(n)$, producing an aliased signal $x_d(n)$ at 100 Hz. It is noted that phase reversals will still be detectable in the aliased signal $x_d(n)$ since the frequency of the phase reversal (2.2 Hz) is slow compared with the aliased signal frequency. The autocorrelator 86 then uses a sliding window to calculate successive autocorrelations of the aliased signal. The decision block 88 detects a phase reversal when the value of the autocorrelation falls below a predetermined threshold, normalized to the signal power. When the decision block 88 recognizes or detects two phase reversals occurring 450 ms apart, the block 88 declares that a modem signal is present.

As noted above, the modem signal detector 12 is ideally optimized to detect phase reversals in a 2100 Hz tone +/−15 Hz as outlined in the international V.25 specification. Given that tones outside the 2100 Hz range may produce false detections, the tone detector 82 rejects signals that have tones outside the 2100 Hz +/−15 Hz range as not having a modem signal. It is noted that the tone detector 82 may employ any method that can reliably detect a 2100 Hz tone over a block of 120 or 160 samples. An exemplary implementation of the tone detector 82 performs a 512-point FFT on the input, $x_{in}$, and then compares the energy in the 2100 Hz bin with the energy outside the 2100 Hz bin. When the energy outside the 2100 Hz bin is 3 dB or more below the energy in the 2100 Hz band, the tone detector 82 indicates that a 2100 Hz tone is detected. It is noted that the tone detector 82 may have difficulty detecting a 2100 Hz tone during phase reversals because the sudden change in phase can produce high frequency energy. Consequently, in the preferred embodiment, the tone detector 82 will still indicate the present of 2100 Hz after initialing detecting a 2100 Hz tone, unless a tone falls outside the 2100 Hz range for 3 consecutive blocks.

It is noted that phase reversals, when present, occur infrequently (at a rate of 2.2 Hz) when compared to the 8 kHz sampling rate of $x_{in}(n)$. Consequently, the preferred modem signal detector 12 includes a down sampler 84 to reduce the number of samples, which, in turn reduces the amount of memory used by the modem signal detector 12 and the calculations needed to determine whether a modem signal is present. The down sampler 84 may generate aliased frequency components but because the aliased frequency components are due to spectral overlap of the original signal frequencies, phase information is preserved. Consequently, any phase reversals will still be detectable in the down sampled signal $x_d(n)$. In the preferred embodiment of the invention, the down sampler 84 down samples the signal $x_{in}(n)$ by a factor of eight, i.e., from a 8 kHz signal to a 1 kHz signal. This changes the 2100 Hz tone into a 100 Hz aliased tone. The down sampler 84 ideally achieves the down sampling of the signal $x_{in}(n)$ by taking every $8^{th}$ sample from the 8 kHz digitized signal $x_{in}(n)$. The resultant aliased signal, $x_d(n)$, has a period of 10 ms or 10 samples at the new sampling rate. Consequently, the block size of the signal is reduced to 15 or 20 samples.

The autocorrelator 86 then operates on the signal $x_d(n)$ to determine whether phase reversals occurs at a 450 ms interval. It is known that the autocorrelation of a signal provides a measure of the "similarity" between two sections of the signal whose starting points are separated or delayed by a particular time interval or "lag". The autocorrelation of a signal x(n) is defined as: $R(k)=\Sigma x(n)x(n+k)$ where k represents the lag factor (delay) and n is the length of each section being compared. It is known for periodic signals with period N, $x(n)=x(n+N)$. Consequently, by setting the lag factor equal to the period N, the Autocorrelation reduces to the energy in the periodic signal: $R(N)=\Sigma x(n)x(n+N)=\Sigma x(n)x(n)=\Sigma x(n)^2=E$ Therefore, the autocorrelation of a signal x(n), normalized to the energy of the signal, is equal to 1 for periodic signals when the autocorrelation lag is equal to the period of the signal. Likewise, the normalized autocorrelation of a periodic signal that contains a 180-degree phase shift is equal to −1 since:

$$x(n)=-x(n+N) \text{ and } R(N)=\Sigma x(n)x(n+N)=\Sigma -x(n)x(n)=-\Sigma x(n)^2=-E.$$

A phase reversal in the middle of a section will result in a normalized autocorrelation value falling in between −1 and +1, depending on where the reversal occurs. In any case, all phase reversals will be evident by a drop in the autocorrelation value.

Thus according to a preferred embodiment, the autocorrelation is used to detect the phase reversal in the aliased signal, $x_d$, by setting the lag equal to the period (10 ms=10 samples) of the 100 Hz aliased signal. Note: the down sampling factor was chosen so that the aliased period is made up of an integer number of samples. This selection helps reduce possible jitter in the autocorrelation value that could be caused by variations in sampling location over a period. In addition, in the preferred embodiment the autocorrelation of $x_d$ is calculated over a window of 20 samples consisting of two adjacent sections made up of 10 samples each (i.e., n=10). Note: a longer window would increase the number of calculations. Further, a longer window would also produce a more smoothed result, reducing the impact of a phase reversal on the autocorrelation value, making the phase reversal more difficult to detect. A shorter window may over-emphasize signal noise in the absence of a phase reversal and could lead to false detections.

Thus, in the present invention the autocorrelation value will remain at a relatively high constant value across windows that do not contain phase reversals. The calculated value across a window in which a phase reversal occurs is dependent on where in the window the reversal occurs. For example, if the reversal occurs at the $10^{th}$ sample, on the border between the two adjacent signal sections, then the autocorrelation will be very negative because the first section is 180 degrees out of phase from the second section. This is the ideal situation for detecting a phase reversal. If however, the reversal occurs at the $1^{st}$ sample, then the autocorrelation won't decrease very much because almost all the points of the two sections are in phase. Consequently, it is very difficult to detect phase reversals that occur near the $1^{st}$ sample. Thus, shifting the window by 5 samples between successive autocorrelation calculations increases the likelihood of the phase reversal occurring towards the middle of the window, and thus producing a large drop in the Autocorrelation value when such a phase reversal occurs.

The resulting Autocorrelation for the modem signal detector is: $R_m(10)=\Sigma x_d(n+5m)x_d(n+5 m+10)$ where m equals the calculation number and each successive calculation shifts the window by 5 samples. Since the Autocorrelation is calculated on a block basis and down sampling reduces the block size to 15 (20) samples, 10 samples from the previous block are stored for use in the current block calculation. Thus, in the preferred embodiment, the autocorrelation is calculated 2 (3) times per block, with the minimum autocorrelation value being passed on to the Decision Block 88 for comparison to a predetermined value to determine whether a phase reversal has occurred.

As noted above, the decision block receives the minimum autocorrelation value for each determination from the autocorrelator 86. In particular, the exemplary decision block performs two steps in order to determine whether a modem signal is present. First, the minimum autocorrelation value is compared to a predetermined threshold to determine if a phase reversal has occurred. Then, when a second phase reversal is detected, the decision block 88 determines whether time between the occurrence of phase reversals is 450 ms plus or minus 25 ms. When both conditions are satisfied, the decision block indicates that a modem signal is present according to the present invention.

In the exemplary embodiment, the predetermined threshold for the decision block 88 is set to 0.01. This threshold was chosen to accommodate any tone in the range of 2100 Hz +/−15 Hz at any signal level. It is noted that the threshold is scaled to match the power level to normalized signal levels where left shifting the threshold by the power's normalized exponent produces appropriate scaling. Further, the power is the sum of the squares over a full block of $x_{in}$ samples. Since the autocorrelation is calculated over fewer values than the power, however, the resulting normalized autocorrelation falls between −0.125 and 0.125. Accordingly, a phase reversal is detected when the autocorrelation is less than the adjusted threshold where the exemplary predetermined, threshold is 0.01 for an autocorrelation value normalized as described above.

As also noted, the decision block 88 indicates a modem signal is present when a first and second detected phase reversal occur within 450 ms from each other plus or minus 25 ms. Thus, the decision block 88 detects at least two phase reversals before determining or deciding when a modem signal is present according to the present invention. In one embodiment, a timer is started when the decision block 88 determines a first phase reversal has occurred. When the decision block determines that a second phase reversal has occurred and the value of the timer is equal to 450 ms +/−25 ms, the decision block 88 indicates that a modem signal is present. Otherwise, when the second phase reversal occurs or is detected outside this time range, the timer is reset and a search is conducted for the next phase reversal. The decision block decides that no modem signal is present when no two consecutive phase reversals meet the time criteria before the end of a 2100 Hz tone.

As noted above in one embodiment of the invention, the system 70 includes a modem signal encoder 54 and a modem signal decoder 64. An exemplary modem signal encoder 54 and modem signal decoder 64 is described below with reference to FIGS. 5 and 6. As can be seen from these FIGURES, the modem decoder 64 performs the inverse function of the modem signal encoder 54, which is described first below. As shown in FIG. 5, the exemplary modem signal encoder 54 includes a downsampling unit 92, a block floating point unit 94, and a bit packer 96. In the preferred embodiment, the encoder 54 is designed to operate with a digital signal sampled at a 8 kHz rate using 8 bit u-law or A-law quantization followed by a conversion to linear 16-bit samples. In this preferred embodiment, the encoder 54 may compress this signal at four different rates, including 24.8 kbps, 30.8 kbps, 36.8 kbps, or 42.8 kbps. Ideally, the compression rate is configurable in the encoder and is embedded in the transmitted packet (such as in a header as described above) so the decoder 64 can adjust its operation to the packet size it receives. Further, in this preferred embodiment, the exemplary modem encoder 54 is designed to transmit V.22bis and V.32bis modem signals. It is noted that the lower two transmission rates of the encoder 54 allow modem connections at or below 9.6 kbps while the two higher rates allow rates as high as 14.4 kbps.

Similar to the modem signal detector 10, The modem signal encoder 54 operates on 10 ms frames, which yields 80 samples per frame at a 8 kHz sampling rate. As noted, the exemplary modem signal encoder 54 includes a downsampling unit 92, a block floating point unit 94, and a bit packer 96. In the preferred embodiment, the downsampling unit 92 bandlimits the signal to 3 kHz and downsamples the voice signal to 6 kHz. The block floating point unit 94 normalizes the 6 kHz signal and converts it to a block floating point format. The bit packer 96 packs the bits of the signal generated by the block floating point unit 94 together into bytes to be packetized by the packet generator 18 and sent to the network 30.

In a preferred embodiment of the invention, the downsampling unit 92 uses a polyphase lowpass FIR filter with 193 taps shown in Table 1 (listed in Q15 format) to bandlimit the input signal, $x_{in}$, (generated from s(t)) while downsampling the signal from 8 kHz to 6 kHz. The input buffer of the unit 92 consists of 80 samples of the input signal, $x_{in}$ and the output buffer consists of 60 samples, which represent the signal $x_d$. In the preferred embodiment of the invention, the input signal $x_{in}$ is bandlimited and downsampled in this way because the modem signals do not have any substantial energy above 3 kHz. It is noted that ideally the input signal $x_{in}$ is downsampled by creating a buffer that is padded with two zeros in between each sample of $x_{in}$. The FIR filter operates on the resulting zero-padded buffer and then every fourth sample output from the FIR filter is retained, thereby creating a 60 sample signal $x_d$. Preferably, the retained samples are multiplied by a gain factor of three to compensate for zero padding.

TABLE 1

| H(0:31) | h(32:63) | h(64:95) | h(96:127) | h(128:159) | h(160:192) |
|---|---|---|---|---|---|
| 0 | 0 | 0 | 8197 | 0 | 0 |
| −6 | −38 | −186 | 7378 | 169 | 34 |
| −9 | −57 | −277 | 5213 | 228 | 45 |
| −7 | −42 | −206 | 2455 | 154 | 30 |
| 0 | 0 | 0 | 0 | 0 | 0 |
| 7 | 47 | 227 | −1467 | −140 | −27 |
| 10 | 71 | 339 | −1724 | −189 | −35 |
| 8 | 53 | 252 | −1042 | −127 | −23 |
| 0 | 0 | 0 | 0 | 0 | 0 |
| −8 | −58 | −281 | 804 | 116 | 21 |
| −13 | −87 | −420 | 1018 | 156 | 27 |
| −10 | −65 | −315 | 651 | 106 | 18 |
| 0 | 0 | 0 | 0 | 0 | 0 |
| 11 | 72 | 355 | −544 | −96 | −16 |
| 16 | 106 | 535 | −710 | −129 | −21 |
| 12 | 79 | 404 | −465 | −87 | −14 |
| 0 | 0 | 0 | 0 | 0 | 0 |
| −14 | −87 | −465 | 404 | 79 | 12 |
| −21 | −129 | −710 | 535 | 106 | 16 |
| −16 | −96 | −544 | 355 | 72 | 11 |
| 0 | 0 | 0 | 0 | 0 | 0 |
| 18 | 106 | 651 | −315 | −65 | −10 |
| 27 | 156 | 1018 | −420 | −87 | −13 |
| 21 | 116 | 804 | −281 | −58 | −8 |
| 0 | 0 | 0 | 0 | 0 | 0 |
| −23 | −127 | −1042 | 252 | 53 | 8 |
| −35 | −189 | −1724 | 339 | 71 | 10 |
| −27 | −140 | −1467 | 227 | 47 | 7 |
| 0 | 0 | 0 | 0 | 0 | 0 |
| 30 | 154 | 2455 | −206 | −42 | −7 |
| 45 | 228 | 5213 | −277 | −57 | −9 |
| 34 | 169 | 7378 | −186 | −38 | −6 |
| | | | | | 0 |

As noted above, the block floating point unit 94 normalizes the signal $x_d$ and converts the signal to a floating point signal. In order to first normalize the signal, the unit 94 first searches $x_d$ for sample having a maximum value, $X_{dmax}$. It is noted that the value $X_{dmax}$ is a 16-bit linear fixed-point value. This value is normalized to eliminate all redundant sign bits. In the preferred embodiment, the value $x_{dmax}$ is normalized by left shifting $x_{dmax}$ until only one sign bit remains. The number of left shifts is saved as the value NLS. In normal block floating point conversions the entire buffer would then be left shifted by NLS. In this embodiment, the signal is also quantized. Accordingly, the unit 94 instead right shifts all samples $x_d$ in the buffer by 16-NLS-n_prec where n_prec is the bit precision of the mantissa of the resulting floating point number. In the preferred embodiment, the mantissa is either 4,5,6, or 7 bits in length corresponding to the rate configuration of 24.8 kbps, 30.8 kbps, 36.8 kbps, or 42.8 kbps respectively. The shifting of the samples linearly quantizes the samples $x_d$ to n_prec bits where the quantization levels are effectively determined by the maximum value of $x_d$.

The output of the block floating point unit is a signal $x_b$, which consists of 60 samples where each sample has n_prec significant bits. The signal $x_b$ also includes an 8-bit sample consisting of the value of NLS "OR"ed with n_prec and left shifted by 4. Accordingly, the signal $x_b$ consists of pkt_size bits where pkt_size=60*(n_prec)+8. The bit packer 96 packs the bits of the signal $x_b$ bytes of 8 bits where the bytes are packetized by the packet generator 18. It is noted that the first 8-bit byte of the resulting signal $x_{net}$ consists of the 8-bit samples having the value of NLS "OR"ed with n_prec and left shifted by 4.

Figure 6:
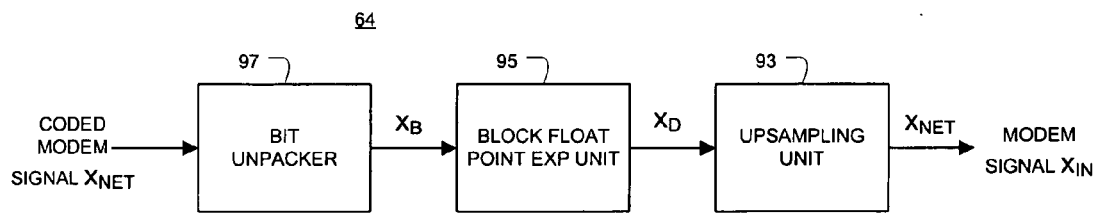
FIG. 6 is a block diagram of an exemplary modem signal decoder in accordance with the present invention where the decoder may be employed in the digital voice transmission system shown in FIG. 3.

As noted above, the decoder 64 performs the inverse process of the encoder 54. An exemplary decoder 54 is shown in FIG. 6. As shown in FIG. 6, the decoder 64 includes a bit unpacker 97, a block floating point exponential unit 95, and an up-sampling unit 93. The bit unpacker 97 reverses the process that performed in the bit-packing unit 96 in the encoder 54. The number of left shifts, NLS, and the bit precision number, n_prec are stored in the first 8-bit byte of the coded modem signal $x_{net}$. The remaining bytes of the coded modem signal $x_{net}$ are unpacked in n_prec bit blocks and into separate words in memory that reproduces the 60 word sample, $x_b$. Using NLS and n_prec values, the block floating point exponential unit 95 left shifts the buffer, $X_b$, by 16-NLS-n_prec places and zero fills the LSB during shifting. Accordingly, the block floating point exponential unit 95 produces the buffer, $x_d$.

Finally, the up-sampling unit 93 uses the same polyphase FIR filter used by the downsampling unit 92 to up-sample the $x_d$ buffer to produce the $x_{in}$ buffer. In particular, the up-sampling unit 93 creates a zero-padded buffer where three zeros are inserted between each sample of $x_d$. Then, FIR filter operates on the resulting buffer and every third output value is saved to generate 80 samples. The value of the 80 samples is then multiplied by a gain factor of 4 to compensate for the zero padding process.

It is noted that variations of the above techniques are possible. In particular, other techniques may be used to detect the present of the answer tone and phase reversals. Consequently, the invention is not to be limited by the specific illustrated embodiment, but only by the scope of the appended claims.

What is claimed is:

1. A method of determining whether a voice signal communicated over a digital voice network includes a modulated data signal, the method comprising the steps of:
   a) determining whether an answer tone is present in the voice signal;
   b) when an answer tone is present, performing the steps of:
      i) locating a first phase reversal in the voice signal, including:
         1) performing an autocorrelation of a segment of the voice signal;
         2) searching for the lowest value of the autocorrelation of the segment of the voice signal;
         3) comparing the determined lowest value of the autocorrelation to a predetermined value; and
         4) indicating a phase reversal has occurred when the determined lowest value is less than the predetermined value;
      ii) locating a second phase reversal in the voice signal, the second phase signal being the next consecutive phase reversal in the voice signal after the first phase reversal;
      iii) determining the time interval between the location of the first phase reversal in the signal and the second phase reversal in the voice signal; and
      iv) indicating that the voice signal includes a modulated data signal when the determined time interval is between a predetermined range of time values.

2. A method of determining whether a voice signal communicated over a digital voice network includes a modulated data signal, the method comprising the steps of:
   a) determining whether an answer tone is present in the voice signal;
   b) when an answer tone is present, performing the steps of:
      i) locating a first phase reversal in the voice signal, including:
      ii) locating a second phase reversal in the voice signal, the second phase signal being the next consecutive phase reversal in the voice signal after the first phase reversal;
      iii) determining a first time interval between the location of the first phase reversal in the signal and the second phase reversal in the voice signal; and
      iv) indicating that the voice signal includes a modulated data signal when the first determined time interval is between a predetermined range of time values;
      v) when the first determined time interval is not between the predetermined range of time values, performing the steps of:
         1) locating a third phase reversal in the voice signal, the third phase signal being the next consecutive phase reversal in the voice signal after the second phase reversal;
         2) determining a second time interval between the location of the second phase reversal in the signal and the third phase reversal in the voice signal;
         3) indicating that the voice signal includes a modulated data signal when the second determined time interval between the location of the second phase reversal in the signal and the third phase reversal in the voice signal is between the predetermined range of time values; and
         4) indicating that the voice signal does not include a modulated data signal when the second determined time interval between the location of the second phase reversal in the signal and the third phase reversal in the voice signal is not between the predetermined range of time values.

3. A method of determining whether a voice signal communicated over a digital voice network includes a modulated data signal, the method comprising the steps of:
   a) determining whether an answer tone is present in the voice signal, including:
      1) selecting a segment of the voice signal;
      2) converting the segment of the voice signal from a time domain signal to a frequency domain signal;
      3) comparing the energy of a bin of the frequency domain signal that corresponds to the frequency of the answer tone with adjacent frequency bins; and
      4) indicating that the answer tone is present in the segment of the voice signal when the energy of the frequency bin corresponding to the frequency of the answer tone is greater than the energy of the adjacent frequency bins;
   b) when an answer tone is present, performing the steps of:
      i) locating a first phase reversal in the voice signal;

13 ii) locating a second phase reversal in the voice signal, the second phase signal being the next consecutive phase reversal in the voice signal after the first phase reversal;
iii) determining the time interval between the location of the first phase reversal in the signal and the second phase reversal in the voice signal; and
iv) indicating that the voice signal includes a modulated data signal when the determined time interval is between a predetermined range of time values.

4. The method according to claim 3, wherein step a) includes the steps of:
a) selecting a segment of the voice signal; and
b) down sampling the selected segment of the voice signal.

5. A method of packetizing a digital voice signal for transmission over a digital voice network where the voice signal may include a modulated data signal, the method comprising the steps of:
a) determining whether an answer tone is present in the voice signal;
b) when an answer tone is present, performing the steps of:
  i) locating a first phase reversal in the voice signal;
  ii) locating a second phase reversal in the voice signal, the second phase signal being the next consecutive phase reversal in the voice signal after the first phase reversal;
  iii) determining the time interval between the location of the first phase reversal in the signal and the second phase reversal in the voice signal; and
  iv) when the determined time interval is between a predetermined range of time values performing the steps of:
    a) demodulating the voice signal to generate a digital data signal;
    b) packetizing the digital data signal into a plurality of digital packets for transmission over the digital voice network.

6. The method according to claim 5, wherein step b) i) includes the steps of:
a) performing an autocorrelation of a segment of the voice signal;
b) searching for the lowest value of the autocorrelation of the segment of the voice signal;
c) comparing the determined lowest value of the autocorrelation to a predetermined value; and
d) indicating a phase reversal has occurred when the determined lowest value is less than the predetermined value.

7. The method according to claim 5, wherein step b) further includes the steps of:
a) when the determined time interval is not between the predetermined range of time values, performing the steps of;
  i) locating a third phase reversal in the voice signal, the third phase signal being the next consecutive phase reversal in the voice signal after the second phase reversal;
  ii) determining the time interval between the location of the second phase reversal in the signal and the third phase reversal in the voice signal;
  iii) when the determined time interval is between the predetermined range of time values performing the steps of:
    a) demodulating the voice signal to generate a digital data signal;

14 b) packetizing the digital data signal into a plurality of digital packets for transmission over the digital voice network; and
  iv) indicating that the voice signal does not include a modulated data signal when the determined time interval between the location of the second phase reversal in the signal and the third phase reversal in the voice signal is not between the predetermined range of time values.

8. The method according to claim 5, wherein step b) further includes the steps of:
a) when the determined time interval is not between the predetermined range of time values, performing the steps of;
  i) locating a third phase reversal in the voice signal, the third phase signal being the next consecutive phase reversal in the voice signal after the second phase reversal;
  ii) determining the time interval between the location of the second phase reversal in the signal and the third phase reversal in the voice signal;
  iii) when the determined time interval between the location of the second phase reversal in the signal and the third phase reversal is between the predetermined range of time values performing the steps of:
    a) demodulating the voice signal to generate a digital data signal;
    b) packetizing the digital data signal into a plurality of digital packets for transmission over the digital voice network; and
  iv) when the determined time interval between the location of the second phase reversal in the signal and the third phase reversal is not between the predetermined range of time values performing the steps of:
    a) compressing the voice signal; and
    b) packetizing the compressed voice signal into a plurality of digital packets for transmission over the digital voice network.

9. The method according to claim 5, wherein step a) includes the steps of:
a) selecting a segment of the voice signal;
b) converting the segment of the voice signal from a time domain signal to a frequency domain signal;
c) comparing the energy of a bin of the frequency domain signal that corresponds to the frequency of the answer tone with adjacent frequency bins; and
d) indicating that the answer tone is present in the segment of the voice signal when the energy of the frequency bin corresponding to the frequency of the answer tone is greater than the energy of the adjacent frequency bins.

10. The method according to claim 9, wherein step a) includes the steps of:
a) selecting a segment of the voice signal; and
b) down sampling the selected segment of the voice signal.

11. A method of packetizing a digital voice signal for transmission over a digital voice network where the voice signal may include a modulated data signal, the method comprising the steps of:
a) determining whether an answer tone is present in the voice signal; and
b) when an answer tone is present, performing the steps of:
  i) locating a first phase reversal in the voice signal;

ii) locating a second phase reversal in the voice signal, the second phase signal being the next consecutive phase reversal in the voice signal after the first phase reversal;
iii) determining the time interval between the location of the first phase reversal in the signal and the second phase reversal in the voice signal; and
iv) when the determined time interval is between a predetermined range of time values performing the steps of:
  a) encoding the voice signal into a digital data signal comprising the modulated data signal by linearly quantizing the voice signal; and
  b) packetizing the coded voice signal into a plurality of digital packets for transmission over the digital voice network.

12. The method according to claim 11, wherein step b) i) includes the steps of:
  a) performing an autocorrelation of a segment of the voice signal;
  b) searching for the lowest value of the autocorrelation of the segment of the voice signal;
  c) comparing the determined lowest value of the autocorrelation to a predetermined value; and
  d) indicating a phase reversal has occurred when the determined lowest value is less than the predetermined value.

13. The method according to claim 11, wherein step b) further includes the steps of:
  a) when the determined time interval is not between the predetermined range of time values, performing the steps of;
    i) locating a third phase reversal in the voice signal, the third phase signal being the next consecutive phase reversal in the voice signal after the second phase reversal;
    ii) determining the time interval between the location of the second phase reversal in the signal and the third phase reversal in the voice signal;
    iii) when the determined time interval is between the predetermined range of time values performing the steps of:
      a) encoding the voice signal into a digital data signal comprising the modulated data signal by linearly quantizing the voice signal; and
      b) packetizing the coded voice signal into a plurality of digital packets for transmission over the digital voice network; and
    iv) indicating that the voice signal does not include a modulated data signal when the determined time interval between the location of the second phase reversal in the signal and the third phase reversal in the voice signal is not between the predetermined range of time values.

14. The method according to claim 11, wherein step b) further includes the steps of:
  a) when the determined time interval is not between the predetermined range of time values, performing the steps of;
    i) locating a third phase reversal in the voice signal, the third phase signal being the next consecutive phase reversal in the voice signal after the second phase reversal;
    ii) determining the time interval between the location of the second phase reversal in the signal and the third phase reversal in the voice signal;
    iii) when the determined time interval between the location of the second phase reversal in the signal and the third phase reversal is between the predetermined range of time values performing the steps of:
      a) encoding the voice signal into a digital data signal comprising the modulated data signal by linearly quantizing the voice signal;
      b) packetizing the coded voice signal into a plurality of digital packets for transmission over the digital voice network; and
    iv) when the determined time interval between the location of the second phase reversal in the signal and the third phase reversal is not between the predetermined range of time values performing the steps of:
      a) compressing the voice signal; and
      b) packetizing the compressed voice signal into a plurality of digital packets for transmission over the digital voice network.

15. The method according to claim 11, wherein step a) includes the steps of:
  a) selecting a segment of the voice signal;
  b) converting the segment of the voice signal from a time domain signal to a frequency domain signal;
  c) comparing the energy of a bin of the frequency domain signal that corresponds to the frequency of the answer tone with adjacent frequency bins; and
  d) indicating that the answer tone is present in the segment of the voice signal when the energy of the frequency bin corresponding to the frequency of the answer tone is greater than the energy of the adjacent frequency bins.

16. The method according to claim 15, wherein step a) includes the steps of:
  a) selecting a segment of the voice signal; and
  b) down sampling the selected segment of the voice signal.

17. A method of transmitting a digital voice signal over a digital voice network where the voice signal may include a modulated data signal, the method comprising the steps of:
  a) determining whether an answer tone is present in the voice signal;
  b) when an answer tone is present, performing the steps of:
    i) locating a first phase reversal in the voice signal;
    ii) locating a second phase reversal in the voice signal, the second phase signal being the next consecutive phase reversal in the voice signal after the first phase reversal;
    iii) determining the time interval between the location of the first phase reversal in the signal and the second phase reversal in the voice signal; and
    iv) when the determined time interval is between a predetermined range of time values performing the steps of:
      a) demodulating the voice signal to generate a digital data signal;
      b) packetizing the digital data signal into a plurality of digital packets for transmission over the digital voice network
  c) transmitting the digital packets across the network;
  d) converting the digital packets into a received digital signal;
  e) determining whether the received signal includes a digital data signal;

f) when the received digital signal includes a digital data signal modulating the received digital signal into a modulated data signal.

18. The method according to claim 17, wherein step b) i) includes the steps of:
   a) performing an autocorrelation of a segment of the voice signal;
   b) searching for the lowest value of the autocorrelation of the segment of the voice signal;
   c) comparing the determined lowest value of the autocorrelation to a predetermined value; and
   d) indicating a phase reversal has occurred when the determined lowest value is less than the predetermined value.

19. The method according to claim 17, wherein step b) further includes the steps of:
   a) when the determined time interval is not between the predetermined range of time values, performing the steps of;
      i) locating a third phase reversal in the voice signal, the third phase signal being the next consecutive phase reversal in the voice signal after the second phase reversal;
      ii) determining the time interval between the location of the second phase reversal in the signal and the third phase reversal in the voice signal;
      iii) when the determined time interval is between the predetermined range of time values performing the steps of:
         a) demodulating the voice signal to generate a digital data signal;
         b) packetizing the digital data signal into a plurality of digital packets for transmission over the digital voice network; and
      iv) indicating that the voice signal does not include a modulated data signal when the determined time interval between the location of the second phase reversal in the signal and the third phase reversal in the voice signal is not between a predetermined range of time values.

20. The method according to claim 17, wherein step b) further includes the steps of:
   a) when the determined time interval is not between the predetermined range of time values, performing the steps of;
      i) locating a third phase reversal in the voice signal, the third phase signal being the next consecutive phase reversal in the voice signal after the second phase reversal;
      ii) determining the time interval between the location of the second phase reversal in the signal and the third phase reversal in the voice signal;
      iii) when the determined time interval between the location of the second phase reversal in the signal and the third phase reversal is between the predetermined range of time values performing the steps of:
         a) demodulating the voice signal to generate a digital data signal;
         b) packetizing the digital data signal into a plurality of digital packets for transmission over the digital voice network; and
      iv) when the determined time interval between the location of the second phase reversal in the signal and the third phase reversal is not between the predetermined range of time values performing the steps of:
         a) compressing the voice signal; and
         b) packetizing the compressed voice signal into a plurality of digital packets for transmission over the digital voice network;
and wherein the method further includes the step of when the received digital signal does not include a digital data signal decompressing the received digital signal into a voice signal.

21. The method according to claim 17, wherein step a) includes the steps of:
   a) selecting a segment of the voice signal;
   b) converting the segment of the voice signal from a time domain signal to a frequency domain signal;
   c) comparing the energy of a bin of the frequency domain signal that corresponds to the frequency of the answer tone with adjacent frequency bins; and
   d) indicating that the answer tone is present in the segment of the voice signal when the energy of the frequency bin corresponding to the frequency of the answer tone is greater than the energy of the adjacent frequency bins.

22. The method according to claim 21, wherein step a) includes the steps of:
   a) selecting a segment of the voice signal; and
   b) down sampling the selected segment of the voice signal.

23. A method of transmitting a digital voice signal over a digital voice network where the voice signal may include a modulated data signal, the method comprising the steps of:
   a) determining whether an answer tone is present in the voice signal;
   b) when an answer tone is present, performing the steps of:
      i) locating a first phase reversal in the voice signal;
      ii) locating a second phase reversal in the voice signal, the second phase signal being the next consecutive phase reversal in the voice signal after the first phase reversal;
      iii) determining the time interval between the location of the first phase reversal in the signal and the second phase reversal in the voice signal; and
      iv) when the determined time interval is between a predetermined range of time values performing the steps of:
         a) encoding the voice signal into a digital data signal comprising the modulated data signal by linearly quantizing the voice signal;
         b) packetizing the coded voice signal into a plurality of digital packets for transmission over the digital voice network
   c) transmitting the digital packets across the network;
   d) converting the digital packets into a received digital signal;
   e) determining whether the received signal includes a coded voice signal; and
   f) when the received digital signal includes a encoded data signal decoding the received digital signal into a modulated voice signal by dequantizing the received digital signal.

24. The method according to claim 23, wherein step b) i) includes the steps of:
   a) performing an autocorrelation of a segment of the voice signal;
   b) searching for the lowest value of the autocorrelation of the segment of the voice signal;
   c) comparing the determined lowest value of the autocorrelation to a predetermined value; and d) indicating a phase reversal has occurred when the determined lowest value is less than the predetermined value.

25. The method according to claim 23, wherein step b) further includes the steps of:
   a) when the determined time interval is not between the predetermined range of time values, performing the steps of;
      i) locating a third phase reversal in the voice signal, the third phase signal being the next consecutive phase reversal in the voice signal after the second phase reversal;
      ii) determining the time interval between the location of the second phase reversal in the signal and the third phase reversal in the voice signal;
      iii) when the determined time interval is between the predetermined range of time values performing the steps of:
         a) encoding the voice signal into a digital data signal comprising the modulated data signal by linearly quantizing the voice signal;
         b) packetizing the coded voice signal into a plurality of digital packets for transmission over the digital voice network; and
      iv) indicating that the voice signal does not include a modulated data signal when the determined time interval between the location of the second phase reversal in the signal and the third phase reversal in the voice signal is not between the predetermined range of time values.

26. The method according to claim 23, wherein step b) further includes the steps of:
   a) when the determined time interval is not between the predetermined range of time values, performing the steps of;
      i) locating a third phase reversal in the voice signal, the third phase signal being the next consecutive phase reversal in the voice signal after the second phase reversal;
      ii) determining the time interval between the location of the second phase reversal in the signal and the third phase reversal in the voice signal;
      iii) when the determined time interval between the location of the second phase reversal in the signal and the third phase reversal is between the predetermined range of time values performing the steps of:
         a) encoding the voice signal into a digital data signal comprising the modulated data signal by linearly quantizing the voice signal;
         b) packetizing the coded voice signal into a plurality of digital packets for transmission over the digital voice network; and
      iv) when the determined time interval between the location of the second phase reversal in the signal and the third phase reversal is not between the predetermined range of time values performing the steps of:
         a) compressing the voice signal; and
         b) packetizing the compressed voice signal into a plurality of digital packets for transmission over the digital voice network;
and wherein the method further includes the step of when the received digital signal does not include a encoded data signal decompressing the received digital signal into a voice signal.

27. The method according to claim 23, wherein step a) includes the steps of:
   a) selecting a segment of the voice signal;
   b) converting the segment of the voice signal from a time domain signal to a frequency domain signal;
   c) comparing the energy of a bin of the frequency domain signal that corresponds to the frequency of the answer tone with adjacent frequency bins; and
   d) indicating that the answer tone is present in the segment of the voice signal when the energy of the frequency bin corresponding to the frequency of the answer tone is greater than the energy of the adjacent frequency bins.

28. The method according to claim 27, wherein step a) includes the steps of:
   a) selecting a segment of the voice signal; and
   b) down sampling the selected segment of the voice signal.

29. The method according to claim 11, wherein step b) iv) a) includes the steps of:
   a) normalizing the voice signal; and
   b) converting the normalized voice signal into a digital floating point signal.

30. The method according to claim 29, wherein step a) includes the steps of:
   a) finding the sample of the voice signal having the maximum value; and
   b) normalizing the sample of the voice signal having the maximum value by left shifting the sample until all redundant sign bits are eliminated where NLS is the number of left shifts; and
   c) right shifting all the samples of the voice signal as a function of NLS.

31. The method according to claim 30, wherein step c) includes the step of right shifting all the samples of the voice signal as a function of NLS and the bit precision of the mantissa of the floating point signal.

32. The method according to claim 30, wherein step c) includes the step of right shifting all the samples of the voice signal by 16-NLS-N_prec where N_prec is the bit precision of the mantissa of the floating point signal.

33. The method according to claim 32, wherein N_prec is set to 4 for 24.8 bits per second (BPS) data signals, 5 for 30.8 BPS data signals, 6 for 36.8 BPS data signals, and 7 for 42.8 BPS data signals.

34. The method according to claim 30, further including the step of downsampling the voice signal from a first rate to a second lower rate.

35. The method according to claim 23, wherein step b) iv) a) includes the steps of:
   a) normalizing the voice signal; and
   b) converting the normalized voice signal into a digital floating point signal.

36. The method according to claim 35, wherein step a) includes the steps of:
   a) finding the sample of the voice signal having the maximum value; and
   b) normalizing the sample of the voice signal having the maximum value by left shifting the sample until all redundant sign bits are eliminated where NLS is the number of left shifts; and
   c) right shifting all the samples of the voice signal as a function of NLS.

37. The method according to claim 36, wherein step c) includes the step of right shifting all the samples of the voice signal as a function of NLS and the bit precision of the mantissa of the floating point signal.

38. The method according to claim 36, wherein step c) includes the step of right shifting all the samples of the voice signal by 16-NLS-N_prec where N_prec is the bit precision of the mantissa of the floating point signal.

39. The method according to claim 38, wherein N_prec is set to 4 for 24.8 bits per second (BPS) data signals, 5 for 30.8 BPS data signals, 6 for 36.8 BPS data signals, and 7 for 42.8 BPS data signals.

40. The method according to claim 35, further including the step of downsampling the voice signal from a first rate to a second lower rate.

41. A method of packetizing a digital voice signal for transmission over a digital voice network where the voice signal may include a modulated data signal, the method comprising the steps of:
  a) determining whether the digital voice signal includes a modulated data signal; and
  b) when the digital voice signal includes a modulated data signal, performing the steps of:
    i) encoding the voice signal into a digital data signal comprising the modulated data signal by linearly quantizing the voice signal;
    ii) finding the sample of the voice signal having the maximum value;
    iii) normalizing the sample of the voice signal having the maximum value by left shifting the sample until all redundant sign bits are eliminated where NLS is the number of left shifts;
    iv) right shifting all the samples of the voice signal as a function of NLS;
    v) converting the normalized voice signal into a digital floating point signal; and
    vi) packetizing the coded voice signal into a plurality of digital packets for transmission over the digital voice network.

42. The method according to claim 41, wherein step c) includes the step of right shifting all the samples of the voice signal as a function of NLS and the bit precision of the mantissa of the floating point signal.

43. The method according to claim 41, wherein step c) includes the step of right shifting all the samples of the voice signal by 16-NLS-N_prec where N_prec is the bit precision of the mantissa of the floating point signal.

44. The method according to claim 43, wherein N_prec is set to 4 for 24.8 bits per second (BPS) data signals, 5 for 30.8 BPS data signals, 6 for 36.8 BPS data signals, and 7 for 42.8 BPS data signals.

45. The method according to claim 41, further including the step of downsampling the voice signal from a first rate to a second lower rate.

46. A method of transmitting a digital voice signal over a digital voice network where the voice signal may include a modulated data signal, the method comprising the steps of:
  a) determining whether the digital voice signal includes a modulated data signal;
  b) when the digital voice signal includes a modulated data signal, performing the steps of:
    i) encoding the voice signal into a digital data signal comprising the modulated data signal by linearly quantizing the voice signal;
    ii) finding the sample of the voice signal having the maximum value;
    iii) normalizing the sample of the voice signal having the maximum value by left shifting the sample until all redundant sign bits are eliminated where NLS is the number of left shifts:
    iv) right shifting all the samples of the voice signal as a function of NLS:
    v) converting the normalized voice signal into a digital floating point signal: and
    vi) packetizing the coded voice signal into a plurality of digital packets for transmission over the digital voice network
  c) transmitting the digital packets across the network;
  d) converting the digital packets into a received digital signal;
  e) determining whether the received signal includes a coded voice signal; and
  f) when the received digital signal includes a encoded data signal decoding the received digital signal into a modulated voice signal by dequantizing the received digital signal.

47. The method according to claim 46, wherein step c) includes the step of right shifting all the samples of the voice signal as a function of NLS and the bit precision of the mantissa of the floating point signal.

48. The method according to claim 46, wherein step c) includes the step of right shifting all the samples of the voice signal by 16-NLS-N_prec where N_prec is the bit precision of the mantissa of the floating point signal.

49. The method according to claim 48, wherein N_prec is set to 4 for 24.8 bits per second (BPS) data signals, 5 for 30.8 BPS data signals, 6 for 36.8 BPS data signals, and 7 for 42.8 BPS data signals.

50. The method according to claim 46, further including the step of downsampling the voice signal from a first rate to a second lower rate.

* * * * *